US 6,538,166 B1

United States Patent
Mahjoob

(10) Patent No.: US 6,538,166 B1
(45) Date of Patent: Mar. 25, 2003

(54) WASTE RUBBER TREATMENT PROCESS AND APPARATUS THEREFOR

(76) Inventor: A. Latif Mahjoob, 9234 Bermudez St., Pico Rivera, CA (US) 90660

( * ) Notice: Subject to any disclaimer, the term of this patent is extended or adjusted under 35 U.S.C. 154(b) by 0 days.

(21) Appl. No.: 09/860,331

(22) Filed: May 18, 2001

(51) Int. Cl.[7] .............................. C10G 1/10; F28D 7/00; C10B 1/10
(52) U.S. Cl. ....................... 585/241; 422/200; 422/233; 202/129
(58) Field of Search ................................. 585/240, 241, 585/242; 202/129; 422/200, 233

(56) References Cited

U.S. PATENT DOCUMENTS

| 3,984,288 | A |   | 10/1976 | Yoshida et al. |         |
|-----------|---|---|---------|----------------|---------|
| 3,985,820 | A | * | 10/1976 | Albright et al.| 585/241 |
| 4,084,521 | A |   | 4/1978  | Herbold et al. |         |
| 4,203,804 | A | * | 5/1980  | Janning et al. | 202/121 |
| 4,235,676 | A |   | 11/1980 | Chambers       |         |
| 4,284,616 | A |   | 8/1981  | Solbakken et al.|        |
| 4,740,270 | A |   | 4/1988  | Roy            |         |
| 4,846,082 | A |   | 7/1989  | Marangoni      |         |
| 5,230,777 | A |   | 7/1993  | Jarrell        |         |
| 5,364,995 | A | * | 11/1994 | Kirkwood et al.| 585/241 |
| 5,628,261 | A |   | 5/1997  | Beckstead et al.|        |
| 5,720,232 | A |   | 2/1998  | Meador         |         |
| 6,018,471 | A |   | 1/2000  | Titus et al.   |         |
| 6,046,370 | A |   | 4/2000  | Affolter et al.|         |

OTHER PUBLICATIONS

Ahmed, Rehan et al. "Rubber Recycling", 20th WEDC conference, transcripts, Sri Lanka, 1994.*
"Wet Approach Venturi Scrubber", product scowcase, Pollution Online, A vertical.net marketplace for Industry Professionals.*

* cited by examiner

Primary Examiner—Bekir L. Yildirim

(57) ABSTRACT

A waste rubber treatment process and appartus therefor for vaporizing rubber and separating the vaporized rubber into its usable components. The waste rubber treatment process and appartus therefor includes heating a quantity of rubber in an atmosphere at a negative pressure and at a temperature between 340 Celsius and 510 degrees Celsius such that the rubber is vaporized and defines a vaporized rubber. The vaporized rubber has a plurality of hydrocarbon constituents therein. A venturi separator sprays the vaporized rubber with oil having a boiling temperature greater than 175 degrees Celsius. The oil binds to heavy oil in the hydrocarbon constituents. A remaining portion of the vaporized rubber is condensed such that light oils in the hydrocarbon constituents liquefy and are separated from hydrocarbon gases.

5 Claims, 6 Drawing Sheets

WASTE RUBBER TREATMENT PROCESS AND APPARATUS THEREFOR

BACKGROUND OF THE INVENTION

1. Field of the Invention

The present invention relates to waste treatment devices and more particularly pertains to a new waste rubber treatment process and appartus therefor for vaporizing rubber and separating the vaporized rubber into its usable components.

2. Description of the Prior Art

The use of waste treatment devices is known in the prior art. More specifically, waste treatment devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,984,288; 6,018,471; 5,628,261; 5,720,232; 6,046,370; 4,846,082; 5,230,777; 4,740,270; 4,284,616; 4,235,676; 4,084,521.

While these devices fulfill their respective, particular objectives and requirements, the aforementioned patents do not disclose a new waste rubber treatment process and appartus therefor. The inventive process includes heating a quantity of rubber in an atmosphere at a negative pressure and at a temperature between 340 Celsius and 510 degrees Celsius such that the rubber is vaporized and defines a vaporized rubber. The vaporized rubber has a plurality of hydrocarbon constituents therein. A venturi separator sprays the vaporized rubber with oil having a boiling temperature greater than 175 degrees Celsius. The oil binds to heavy oil in the hydrocarbon constituents. A remaining portion of the vaporized rubber is condensed such that light oils in the hydrocarbon constituents liquefy and are separated from hydrocarbon gases.

The procedures in the prior art do not deliver a product as clean as the present procedure which produces down to 4% sulfur oil. Also, the use of a heat exchanger, as discussed below, provides a more efficient system for heating the rubber and maintains a lower exhaust temperature. The venture separator makes the process unique for obtaining a very clean by-product which, would be, as fuel; direct replacement for #2 diesel or better. The process also prevents the need for expensive filtration methods as the system is enclosed and any gaseous by-products are stored in a tank and reused as fuel for future processes, producing negligible emissions.

Additional waste material which may be processed with this system include items such as general waste rubber, lubricants, sewage sludge, plastics, contaminated soils, tank bottoms, solvents, site contaminants, refinery wastes and waste wood products. The process, as shown below, is directed primarily to the vaporization and treatment of rubber obtained from tires.

In these respects, the waste rubber treatment process and appartus therefor according to the present invention substantially departs from the conventional concepts and designs of the prior art, and in so doing provides an apparatus primarily developed for the purpose of vaporizing rubber and separating the vaporized rubber into its usable components.

SUMMARY OF THE INVENTION

In view of the foregoing disadvantages inherent in the known types of waste treatment devices now present in the prior art, the present invention provides a new waste rubber treatment process and appartus therefor construction wherein the same can be utilized for vaporizing rubber and separating the vaporized rubber into its usable components.

The general purpose of the present invention, which will be described subsequently in greater detail, is to provide a new waste rubber treatment process and appartus therefor apparatus and method which has many of the advantages of the waste treatment devices mentioned heretofore and many novel features that result in a new waste rubber treatment process and appartus therefor which is not anticipated, rendered obvious, suggested, or even implied by any of the prior art waste treatment devices, either alone or in any combination thereof.

To attain this, the present invention generally comprises heating a quantity of rubber in an atmosphere at a negative pressure and at a temperature between 340 Celsius and 510 degrees Celsius such that the rubber is vaporized and defines a vaporized rubber. The vaporized rubber has a plurality of hydrocarbon constituents therein. A venturi separator sprays the vaporized rubber with oil having a boiling temperature greater than 175 degrees Celsius. All vapors entering the venturi separator having a boiling temperature greater than 175 degrees Celsius bind to heavy oil in the hydrocarbon constituents. A remaining portion of the vaporized rubber is condensed in a separate condenser such that light oils in the hydrocarbon constituents liquefy and are separated from hydrocarbon gases.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new waste rubber treatment process and appartus therefor apparatus and method which has many of the advantages of the waste treatment devices mentioned heretofore and many novel features that result in a new waste rubber treatment process and appartus therefor which is not anticipated, rendered obvious, suggested, or even implied by any of the prior art waste treatment devices, either alone or in any combination thereof.

It is another object of the present invention to provide a new waste rubber treatment process and appartus therefor which may be easily and efficiently manufactured and marketed.

It is a further object of the present invention to provide a new waste rubber treatment process and appartus therefor which is of a durable and reliable construction.

An even further object of the present invention is to provide a new waste rubber treatment process and appartus therefor which is susceptible of a low cost of manufacture with regard to both materials and labor, and which accordingly is then susceptible of low prices of sale to the consuming public, thereby making such waste rubber treatment process and appartus therefor economically available to the buying public.

Still yet another object of the present invention is to provide a new waste rubber treatment process and appartus therefor which provides in the apparatuses and methods of the prior art some of the advantages thereof, while simultaneously overcoming some of the disadvantages normally associated therewith.

Still another object of the present invention is to provide a new waste rubber treatment process and appartus therefor for vaporizing rubber and separating the vaporized rubber into its usable components.

Yet another object of the present invention is to provide a new waste rubber treatment process and appartus therefor which includes heating a quantity of rubber in an atmosphere at a negative pressure and at a temperature between 340 Celsius and 510 degrees Celsius such that the rubber is vaporized and defines a vaporized rubber. The vaporized rubber has a plurality of hydrocarbon constituents therein. A venturi separator sprays the vaporized rubber with oil having a boiling temperature greater than 175 degrees Celsius. Heavy hydrocarbon gases with a boiling temperature higher than 175 degrees Celsius bind to the oil spray and condense at the bottom of the venturi separator. The remaining hydrocarbons travel through in a gaseous phase throughout the venturi separator into a condenser where all liquefied components will condense and separate from non condensing gases.

Still yet another object of the present invention is to provide a new waste rubber treatment process and appartus therefor that converts rubber into usable fuel in an efficient manner which does not release contaminants into the atmosphere.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
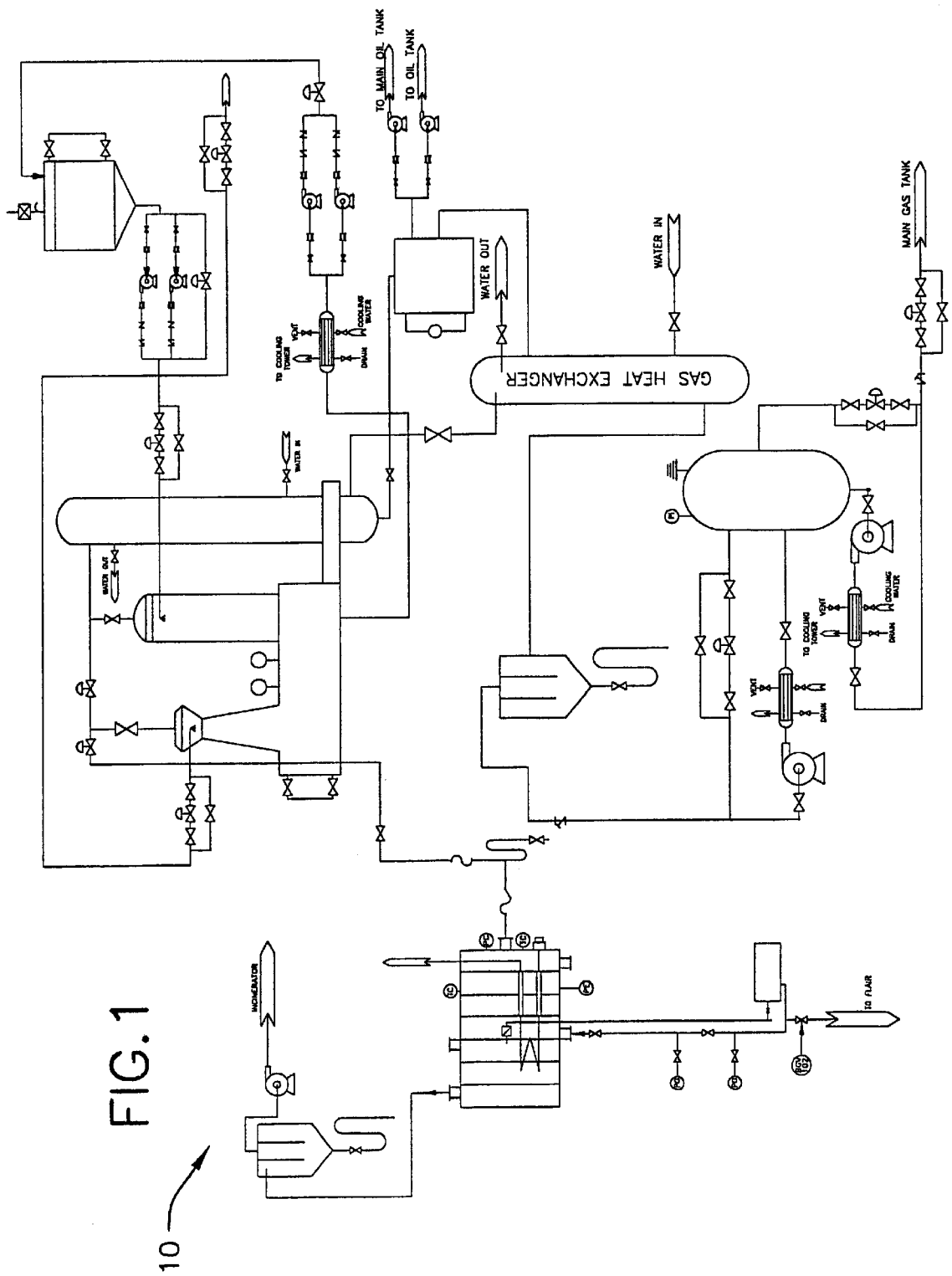
FIG. 1 is a schematic view of a new waste rubber treatment process and appartus therefor according to the present invention.
Figure 2:
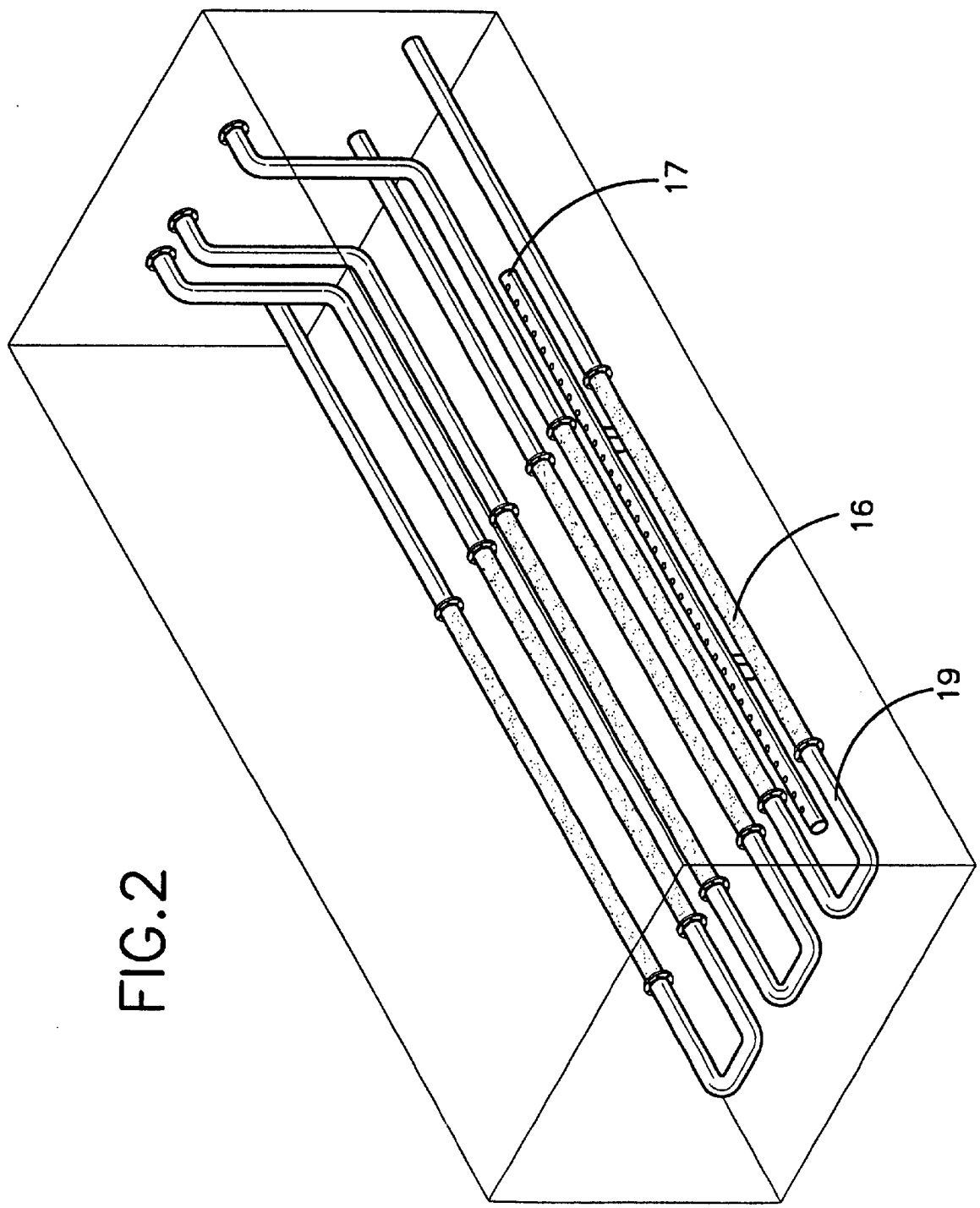
FIG. 2 is a schematic perspective view of the furnace of the present invention.
Figure 3:
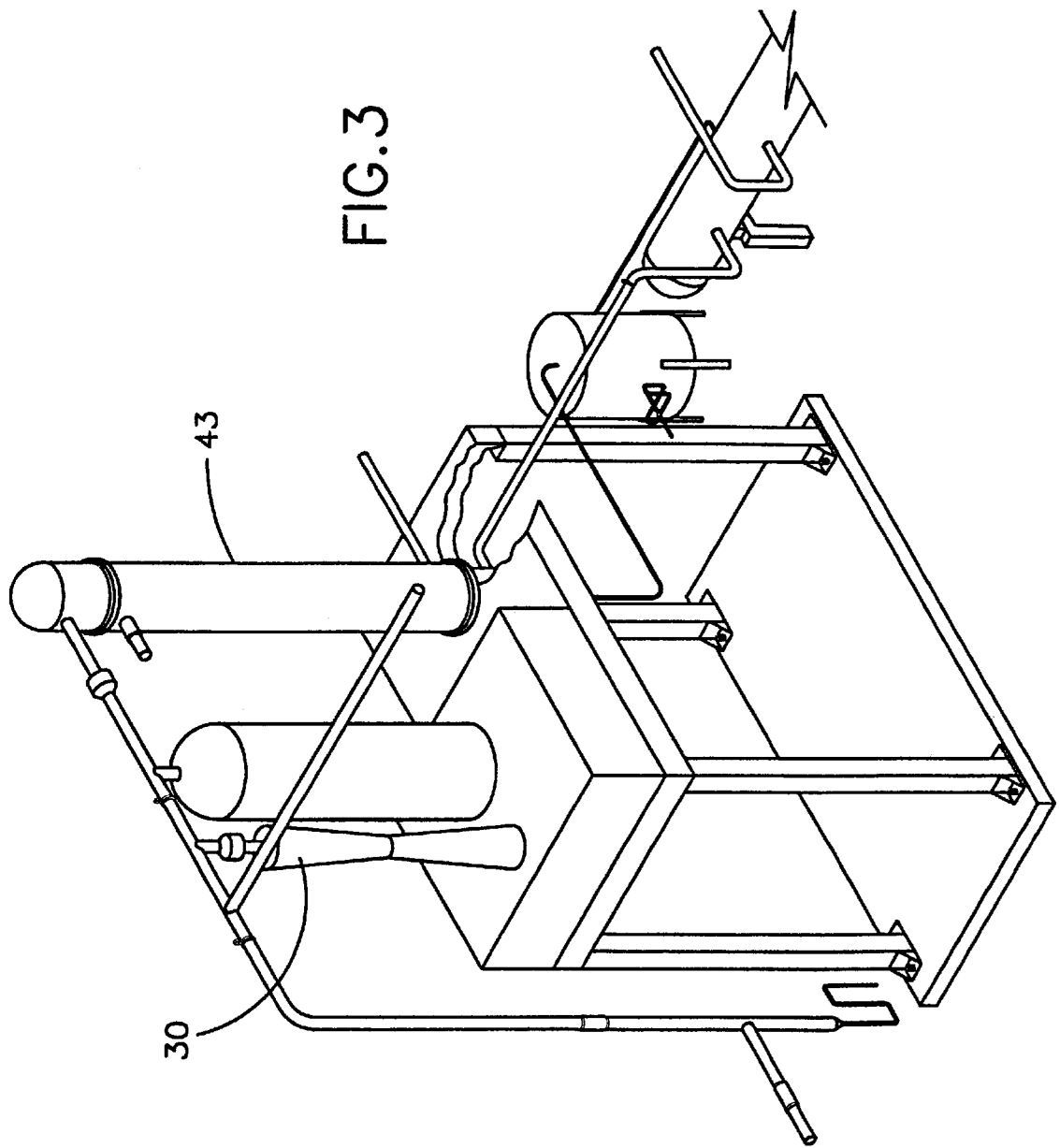
FIG. 3 is a schematic perspective view of the apparatus of the present invention.
Figure 4:
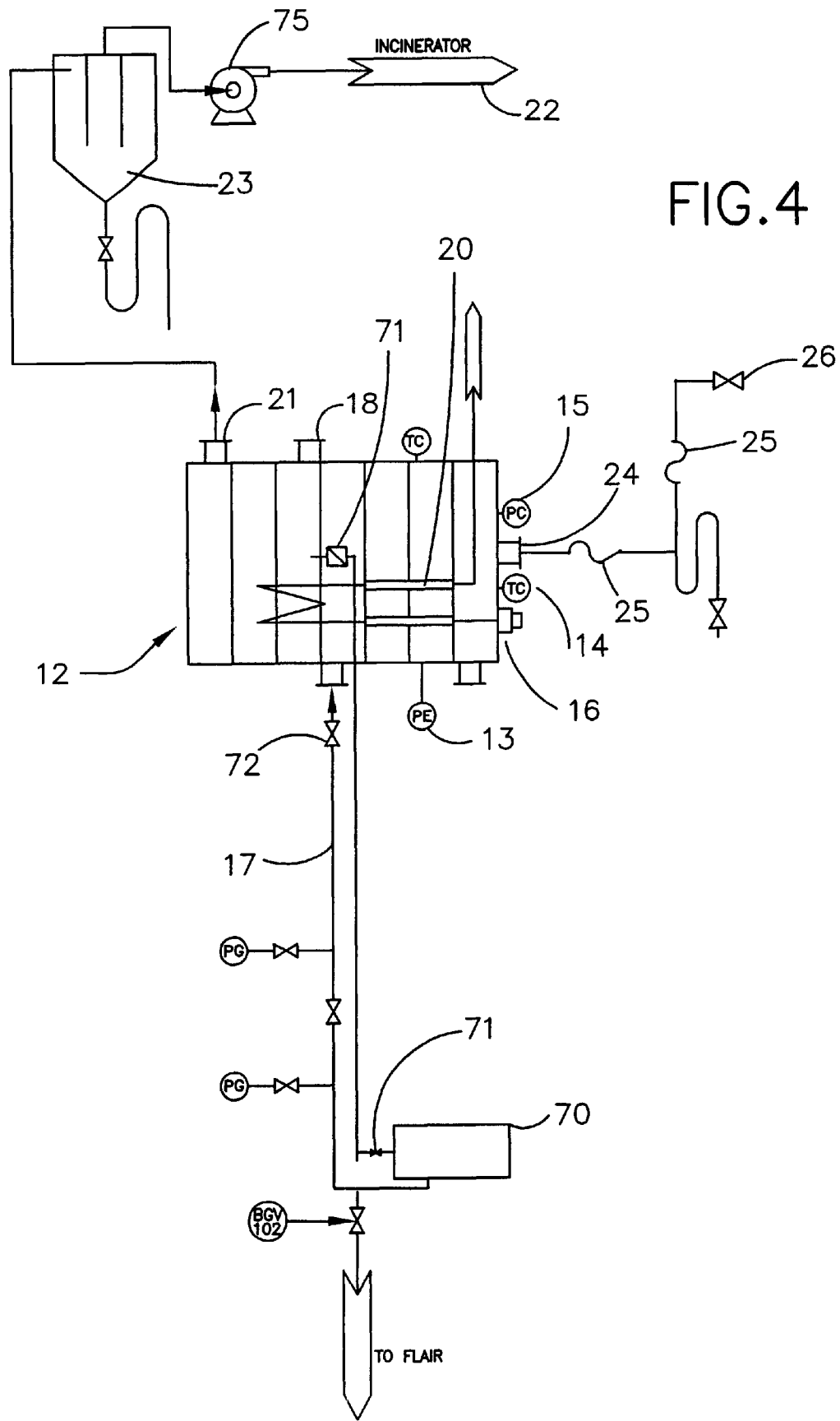
FIG. 4 is an exploded schematic view of the present invention.
Figure 5:
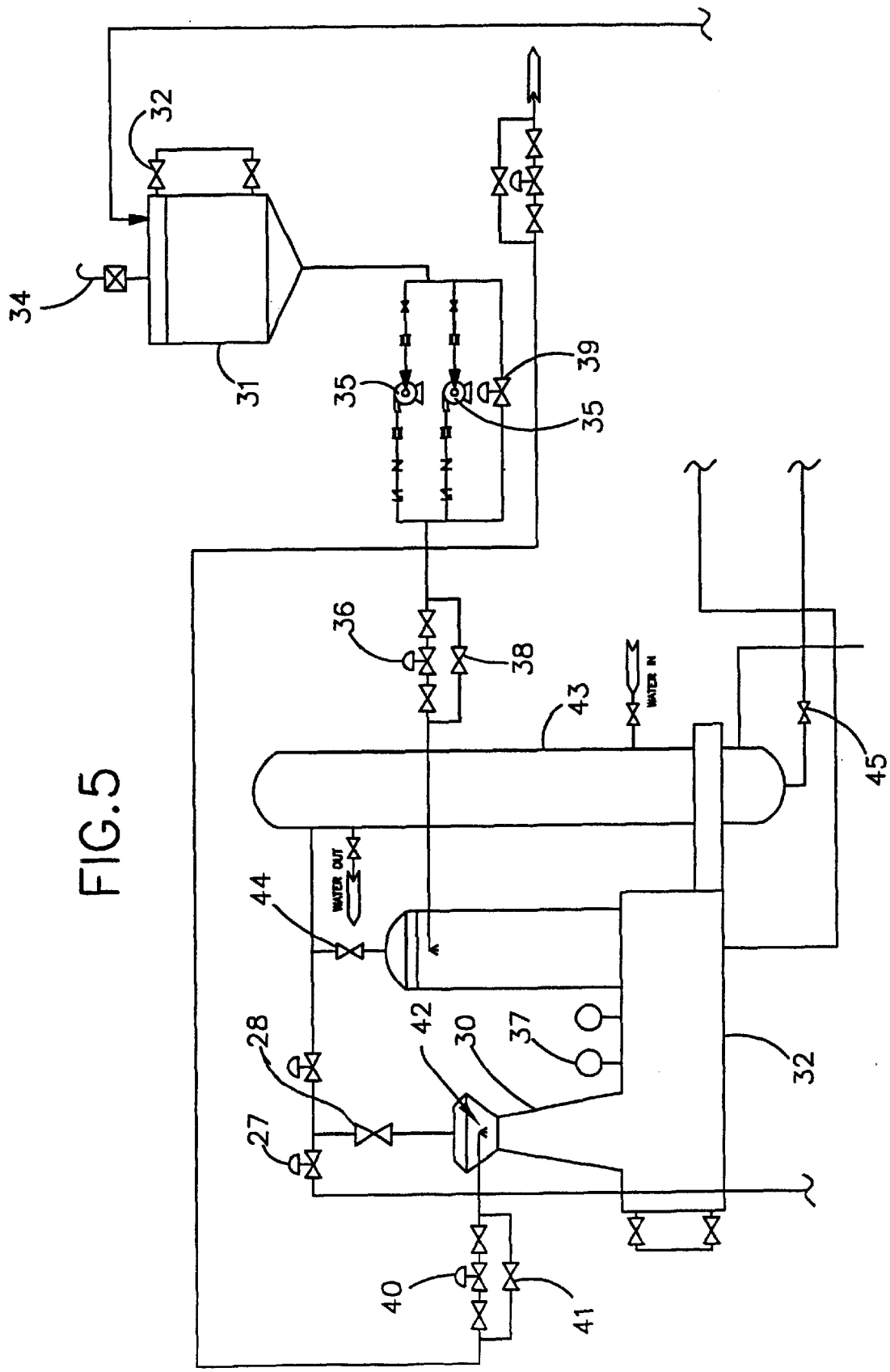
FIG. 5 is an exploded schematic view of the present invention.
Figure 6:
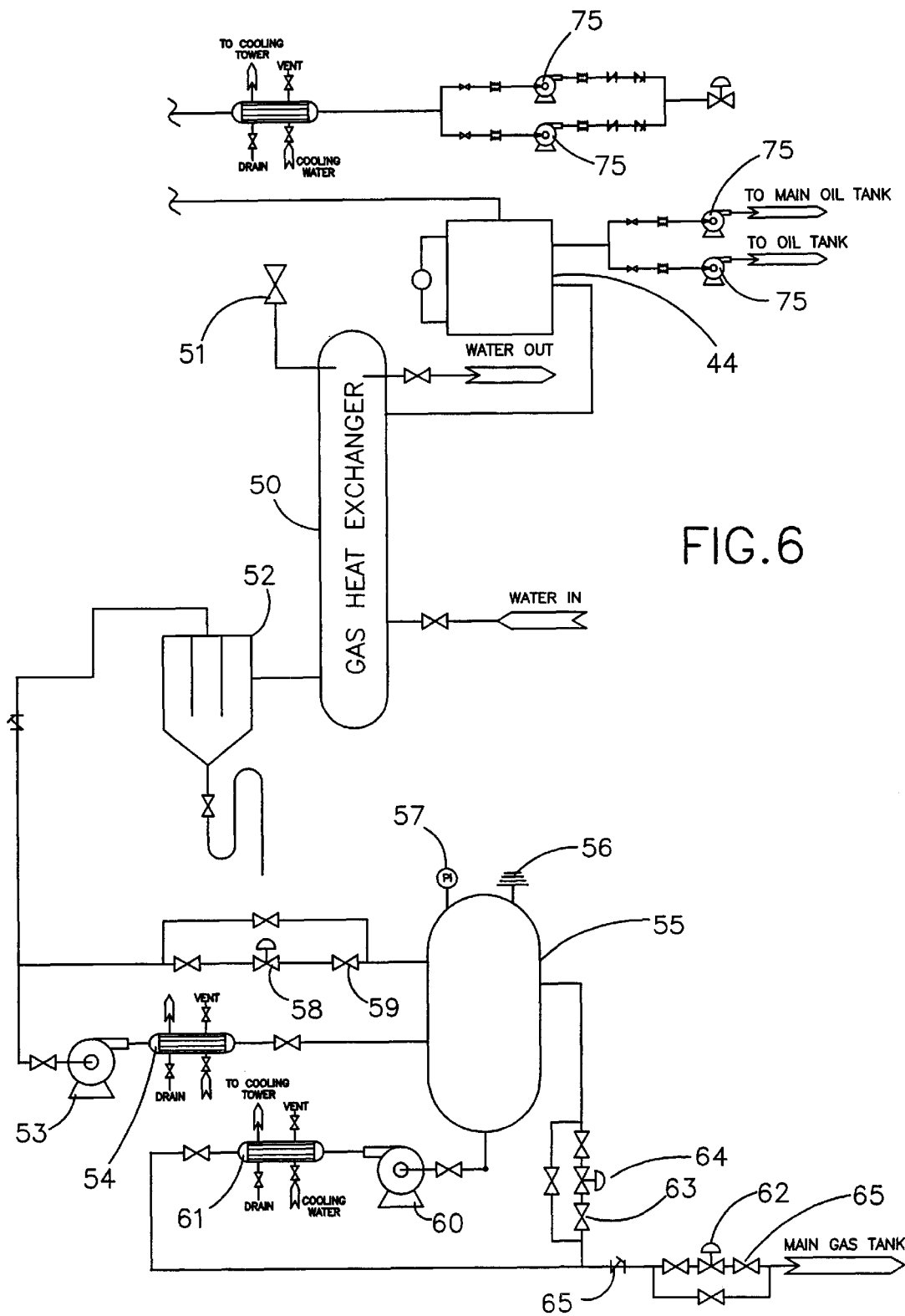
FIG. 6 is an exploded schematic view of the present invention.

With reference now to the drawings, and in particular to FIGS. 1 through 6 thereof, a new waste rubber treatment process and appartus therefor embodying the principles and concepts of the present invention and generally designated by the reference numeral 10 will be described.

As best illustrated in FIGS. 1 through 6, the waste rubber treatment process and appartus therefor 10 generally comprises a furnace 12 having nitrogen gas introduced therein such that the furnace has an interior with an atmosphere has an oxygen gas content of less than 6%, the furnace. The furnace 12 is ideally a radiant heat furnace designed to contain a large amount shredded tires. Tires are placed into the furnace 12 and heated at a temperature between 340 Celsius and 510 degrees Celsius such that the rubber is vaporized and defines a vaporized rubber. The furnace 12 is monitored such that it is turned off after once the temperature reaches 510° C. The vaporized rubber has a plurality of hydrocarbon constituents therein. The hydrocarbon constituents include heavy oils having a boiling point greater than 175 degrees Celsius, light oils having a boiling point between 36 degrees Celsius and 175 degrees Celsius, and hydrocarbon gases having a boiling point less than 36 degrees Celsius.

A blower 75, or pump, is in fluid communication with the furnace such that the interior of the furnace 12 has an atmospheric pressure of between −2 inches of water to −8 inches of water. The lowered pressure creates a more efficient process and helps to ensure that materials from the furnace do not escape into the atmosphere. A pressure sensitive valve releases the contents into an incinerator 22 if the pressure increases to unacceptable levels. The blowers 75 draw the vaporized rubber through the remainder of the apparatus.

A venturi separator 30 is in fluid communication with the furnace 12. The venturi separator 30 contains a plurality of nozzles and horizontally sprays the vaporized rubber with oil having a boiling temperature greater than 175 degrees Celsius. The heavy oils are bound to the oil in the venturi separator and removed from the vaporized rubber. By altering the flow of the oil through the nozzles, the operating temperature of the venturi separator can be regulated which produces a cleaner product.

A heavy oil tank 31 is in fluid communication with the venturi separator 30. The heavy oil captured by the venturi separator 30 is collected and stored in the heavy oil tank 31.

The remainder of the vaporized rubber not captured by the venturi separator continues to a condenser 43 fluidly coupled to the venturi separator 30 such that the light oils and hydrocarbon gases may bypass the heavy oil tank and enter the condenser. The condenser 43 cools the vaporized rubber to a temperature of less than 30 degrees Celsius such that the light oils liquefy. The light oils are contained in a separate tank.

The hydrocarbon gases continue past the condenser 43 and enter a cyclone separator 52 fluidly coupled to the condenser 43 so that liquids in the hydrocarbon gases may be dried before continuing on to a tank for holding the gases. The blower 60 is in fluid communication with the cyclone separator such that the hydrocarbon gases are drawn through the blower.

The following is a list of the typical products of the system.

The hydrocarbon gases include by volume:

14.6% $H_2$
7.84% $CO_2$
8.07% $C_2H_6$
31.17% $CH_4$
3.59% CO
27.11% heavy gasses containing 3 or more carbon atoms The light and heavy oil percentages below are a percentage by weight of a mixture the heavy and light oils.

The light oils include:

1.75% $C_5H_{12}$ n-pentene
3.25% $C_6H_{14}$ n-hexane
7.25% $C_7H_{16}$ n-heptane
9.5% $C_6H_6$ benzene
9.5% $C_7H_8$ toluene
7.5% $C_8H_{10}$ ethyl benzene
8.0% $C_8H_{10}$ xylene
10.5% $C_8H_8$ styrene
2.0% $C_9H_{20}$ nonane
2.75% $C_{10}H_{22}$ decane The heavy oils include:

13.3% $C_{10}H_{10}$ limonene
4.0% $C_{11}H_{24}$ undecane
1.0% $C_{10}H_8$ naphthelene
3.0% $C_{11}H_{10}$ methyl naphthyl
3.0% $C_{12}H_{26}$ dodecane
4.0% $C_{13}H_{28}$ tridecane
2.7% $C_{14}H_{10}$ anthracene
7.0% $C_{19}H_x$ waxes.

The furnace ideally has a plurality of steam vents therein for cleaning and purging the system. The waste products include recyclable metal and carbon black, both of which may be used in other manufacturing processes.

The gaseous material extracted may be used as natural gas while the liquid components may be used as fuels such as Diesel #1 and the heavy oils may be used also for fuels and for oil such as #4 oil. The carbon black is used in for inks, asphalt and water filters. The system is self-contained and operates under negative pressure to prevent contaminants from entering the atmosphere.

Additional valves and blowers may be used for safety reasons and keeping temperatures and pressures constant. A heat exchanger is envisioned for thermally coupling the furnace to the condenser for conserving energy during the process.

FIGS. 1, 4–6 show one embodiment of the system and is composed of a furnace 12 having a pressure indicator 13, temperature control 14 and pressure control 15. The temperature control 14 will shut down the burners 16 when the set temperature is achieved. The pressure control 15 modulates valves connected to the blower system controlling the furnace pressure to stay at a predetermined set pressure, and will shut the system down when the negative pressure of the furnace 12 exceeds a pre-set pressure. The steam injection system 17 cools and purges the furnace 12 to ensure the furnace is safe to be opened. The furnace 12 has an inspection port 18. The furnace 12 preferably has one to three burners 16 which may be operated with oil or gas. These burners 16 are designed to fire in tubes 19. Each tube 19 is equipped with preferably two heat exchangers 20. A relief valve 21 sends the gases in the furnace 12 to an incinerator 22 if the pressure exceeds safe limits. Usable liquids are caught in a cyclone separator 23 between the incinerator and the furnace.

Gases travel from the furnace 12 through an outlet 24, expansion joints 25, isolation valve 26, motorized valve 27 and a second isolation valve 28 into the venturi system 30. An oil tank 31, equipped with sight glass 32 and relief valve 34, supply oil to a pumps 35 for pumping oil to the venturi system 30. The oil travels through a metering valve 36 which is controlled by a temperature control 37. If the temperature is below the set point of the temperature control 37, the metering valve 36 closes to reduce the amount of oil injected into the venturi system 30. A by-pass valve 38 may be added maintaining the metering valve 36. Extra oil may be re-circulated through a relief valve 39 back to the oil pump 35 inlet. A second oi.1 injection system supplies to the venturi system by a second metering valve 40 or through a back-up valve 41 to the venturi mixing nozzle 42. The mixing of the gases from the vaporization of the rubber with the oil condenses the heavy oil at a pre-set temperature while releasing all of the light oil and hydrocarbon gases which move to the condenser 43 through another isolation valve 44.

All light oils are generally expected to condense while passing through the condenser 43 and enter a tank 44 through a valve 45. Gases which travel through the condenser 43 are now transferred to the heat exchanger 50 via a valve 51 for further cooling. The gases are transferred to a cyclone separator 52 where any liquid oil residue is separated from the remainder of the gases.

The gas is then drawn by a blower 53 and pumped through an after cooler 54 into an intermediate gas tank 55. The intermediate gas tank 55 has a relief valve 56 and tank pressure control 57. Gases from the gas tank 55 are allowed to re-circulate through a modulating valve 58 and isolations valves 59. The modulation valve 58 keeps the furnace pressure at a set point by modulating open and closed to balance the draw on the furnace. Another blower 60 and after cooler 61 are supplied to perform two functions. The additional blower 60 will re-circulate gases through an intermediate gas tank via a modulation valve 64 and two isolation valves 63. Also envisioned, when the pressure in the gas tank reaches a certain pre-set pressure, a modulation valve 62 opens and the modulation valve 64 closes to send gases to a larger holding tank, which is not shown. When the intermediate tank pressure is reduced, the two modulation valves 62, 64 reverse action. A check valve 65 prevents any reverse flow to the intermediate tank 55 from the large holding tank.

When the process is complete, isolation valve 26 is closed. Steam is injected from a boiler 70 to the bottom of the furnace 12. Steam is used to cool the furnace 12 and purge unsafe gasses from the furnace to the boilers 70 for combustion. The steam/gasses mixture travel through an exhaust valve 71 back to a burner's combustion zone in the boiler 70 for complete combustion. A steam supply valve 72 and exhaust valve 71 are closed after the furnace 12 is purged, at which time the furnace 12 may be reloaded with rubber waste.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A process for treating waste rubber comprising in series the steps of:

heating a quantity of rubber in an atmosphere having less than 6% oxygen gas content at a temperature between 340 Celsius and 510 Celsius and a negative pressure such that said rubber is vaporized and defines a vaporized rubber, said vaporized rubber having a plurality of hydrocarbon constituents therein; said heating being performed by radiant means;

spraying said vaporized rubber with an oil having a boiling temperature greater than 175 degrees Celsius by a venturi separator, such that said oil binds to heavy oil in said hydrocarbon constituents;

condensing a remaining portion of the vaporized rubber such that light oils in said hydrocarbon constituents liquefy and are separated from non-condensing hydrocarbon gases.

2. The process for treating waste rubber as in claim 1, wherein said negative pressure is between −2 inches of water to −8 inches of water.

3. The process for treating waste rubber as in claim 1, wherein said hydrocarbon constituents include heavy oils having a boiling point greater than 175 degrees Celsius, light oils having a boiling point between 36 degrees Celsius and 175 degrees Celsius, and non-condensing hydrocarbon gases having a boiling point less than 36 degrees Celsius;

wherein said hydrocarbon gases include;
14.6% $H_2$,
7.84% $CO_2$,
8.07% $C2H_6$,
31.17% $CH_4$,
3.59% CO, and
27.11% molecules containing 3 or more carbon atoms;

wherein said light oils include;
1.75% $C_5H_{12}$ n-pentene,
3.25% $C_6H_{14}$ n-hexane,
7.25% $C_7H_{16}$ n-heptane,
9.5% $C_6H_6$ benzene,
9.5% $C_7H_8$ toluene,
7.5% $C_8H_{10}$ ethyl benzene,
8.0% $C_8H_{10}$ xylene,
10.5% $C_8H_8$ styrene,
2.0% $C_9H_{20}$ nonane,
2.75% $C_{10}H_{22}$ decane, wherein said heavy oils include;
13.3% $C_{10}H_{10}$ limonene,
4.0% $C_{11}H_{24}$ undecane,
1.0% $C_{10}H_8$ naphthelene,
3.0% $C_{11}H_{10}$ methyl naphthyl,
3.0% $C_{11}H_{26}$ dodecane,
4.0% $C_{13}H_{28}$ tridecane,
2.7% $C_{14}H_{10}$ anthracene,
7.0% $C_{19}H_x$ waxes;

wherein percentages of said heavy and light oils are for all heavy and light oils.

4. A method for treating waste rubber comprising the steps of:

providing a radiant heat furnace having nitrogen gas introduced therein such that said furnace has an interior with an atmosphere having an oxygen gas content of less than 6%;

heating a quantity of rubber in said furnace at a temperature between 340 Celsius and 510 degrees Celsius such that said rubber is vaporized and defines a vaporized rubber, said vaporized rubber having a plurality of hydrocarbon constituents therein, said hydrocarbon constituents including heavy oils having a boiling point greater than 175 degrees Celsius, light oils having a boiling point between 36 degrees Celsius and 175 degrees Celsius, and non-condensing hydrocarbon gases having a boiling point less than 36 degrees Celsius;

providing a blower in fluid communication with said furnace such that said interior of said furnace has an atmospheric pressure of between −2 inches of water to −8 inches of water;

providing a venturi separator being in fluid communication with said furnace, said venturi separator containing a plurality of nozzles and horizontally spraying said vaporized rubber with an oil having a boiling temperature greater than 175 degrees Celsius, said heavy oils being bound to said oil in said venturi separator;

providing a heavy oil tank in fluid communication with said venturi separator, said heavy oil being collected in said heavy oil tank;

providing a condenser being fluidly coupled to said venturi separator such that said light oils and hydrocarbon gases bypass said heavy oil tank and enter said condenser;

condensing a remaining portion of the vaporized rubber such that said light oils liquefy by cooling said remaining portion to a temperature of less than 30 degrees Celsius;

providing a cyclone separator being fluidly coupled to said condenser such that liquids in said non-condensing hydrocarbon gases are released from said non-condensing hydrocarbon gases;

wherein said blower is fluidly coupled to said cyclone separator such that said non-condensing hydrocarbon gases are drawn through said blower;

wherein said non-condensing hydrocarbon gases include;
14.6% $H_2$,
7.84% $CO_2$,
8.07% $C2H_6$, 31.17% $CH_4$,
3.59% CO, and
27.11% molecules containing 3 or more carbon atoms;
wherein said light oils include;
  1.75% $C_5H_{12}$ n-pentene,
  3.25% $C_6H_{14}$ n-hexane,
  7.25% $C_7H_{16}$ n-heptane,
  9.5% $C_6H_6$ benzene,
  9.5% $C_7H_8$ toluene,
  7.5% $C_8H_{10}$ ethyl benzene,
  8.0% $C_8H_{10}$ xylene,
  10.5% $C_8H_8$ styrene,
  2.0% $C_9H_{20}$ nonane,
  2.75% $C_{10}H_{22}$ decane,
wherein said heavy oils include;
  13.3% $C_{10}H_{10}$ limonene,
  4.0% $C_{11}H_{24}$ undecane,
  1.0% $C_{10}H_8$ naphthelene,
  3.0% $C_{11}H_{10}$ methyl naphthyl,
  3.0% $C_{12}H_{26}$ dodecane,
  4.0% $C_{13}H_{28}$ tridecane,
  2.7% $C_{14}H_{10}$ anthracene,
  7.0% $C_{19}H_x$ waxes;
wherein percentages of said heavy and light oils are for all heavy and light oils.

5. An apparatus for treating waste rubber comprising:

a furnace having nitrogen gas introduced therein such that said furnace has an interior with an atmosphere having an oxygen gas content of less than 6%, wherein a quantity of rubber may be heated in said furnace at a temperature between 340 Celsius and 510 degrees Celsius such that said rubber is vaporized and defines a vaporized rubber, said vaporized rubber having a plurality of hydrocarbon constituents therein, said hydrocarbon constituents including heavy oils having a boiling point greater than 175 degrees Celsius, light oils having a boiling point between 36 degrees Celsius and 175 degrees Celsius, and non-condensing hydrocarbon gases having a boiling point less than 36 degrees Celsius;

a blower in fluid communication with said furnace such that said interior of said furnace has an atmospheric pressure of between −2 inches of water to −8 inches of water;

a venturi separator being in fluid communication with said furnace, said venturi separator containing a plurality of nozzles and horizontally spraying said vaporized rubber with an oil having a boiling temperature greater than 175 degrees Celsius, said heavy oils being bound to said oil in said venturi separator;

a heavy oil tank in fluid communication with said venturi separator, said heavy oil being collected in said heavy oil tank;

a condenser being fluidly coupled to said venturi separator such that said light oils and non-condensing hydrocarbon gases bypass said heavy oil tank and enter said condenser, wherein a remaining portion of the vaporized rubber is drawn through said condenser such that said light oils liquefy by cooling said remaining portion to a temperature of less than 30 degrees Celsius;

wherein said non-condensing hydrocarbon gases are drawn through said blower.

* * * * *